United States Patent [19]

Fordyce et al.

[11] 4,048,265

[45] Sept. 13, 1977

[54] DEICING APPARATUS FOR WATER COOLING TOWERS INCLUDING SLOTTED DISTRIBUTION BASIN AND SELECTIVELY ACTUATABLE VALVE MECHANISM

[75] Inventors: Homer E. Fordyce, Kansas City, Mo.; William C. Carter, Lenexa, Kans.

[73] Assignee: The Marley Company, Mission, Kans.

[21] Appl. No.: 662,560

[22] Filed: Mar. 1, 1976

[51] Int. Cl.² .............................................. F28C 1/04
[52] U.S. Cl. ............................ 261/111; 261/DIG. 11; 239/568; 251/61.1; 251/61.2
[58] Field of Search ............... 261/110, 111, DIG. 11, 261/67; 251/46, 61.1, 61.2, 144, 326–328, 333; 137/599, 625.3; 222/482, 575; 239/558, 568, 583, 556, 557, 567, 562–564

[56] References Cited

U.S. PATENT DOCUMENTS

| | | | |
|---|---|---|---|
| 2,473,933 | 6/1949 | Zielinski | 239/451 |
| 2,836,233 | 5/1958 | Schoenmakers et al. | 239/568 |
| 3,012,751 | 12/1961 | Hauser | 251/61 |
| 3,237,914 | 3/1966 | Alix | 251/61.2 |
| 3,322,409 | 5/1967 | Reed | 261/111 |
| 3,880,964 | 4/1975 | Fordyce et al. | 261/DIG. 11 |

FOREIGN PATENT DOCUMENTS 2,512,397  10/1975  Germany ............................. 261/111

Primary Examiner—Tim R. Miles
Assistant Examiner—Gregory N. Clements
Attorney, Agent, or Firm—Schmidt, Johnson, Hovey & Williams

[57] ABSTRACT

A simplified, selectively actuatable deicing apparatus for evaporative water cooling towers is provided which permits selective delivery of hot water from the upper distribution basin to the outer margin of the tower for deicing of the fill structure and inlet louvers thereof in order to maintain adequate airflow through the tower during sub-freezing ambient conditions. The deicing apparatus includes structure defining a substantially continuous water passageway or slot in the distribution basin adjacent the outer margin thereof, in combination with valving devices in the form of a series of elongated, individually shiftable cover members which can be selectively raised to permit flow of hot water through the slot in sufficient quantities to deice the outermost areas of the tower which are prone to ice clogging. In preferred forms the cover members are controlled by a series of lifting mechanisms having flexible bladders which can be variably filled with a fluid such as air or nitrogen and expanded in order to lift the cover members away from the underlying slots to thereby permit flow of hot water therethrough for deicing operations.

11 Claims, 7 Drawing Figures

DEICING APPARATUS FOR WATER COOLING TOWERS INCLUDING SLOTTED DISTRIBUTION BASIN AND SELECTIVELY ACTUATABLE VALVE MECHANISM

This invention relates to water cooling towers especially adapted for wintertime operations in cold climates by provision of specialized deicing apparatus for permitting selective deicing of the outer margin of the tower as necessary to ensure that tower performance is not lessened because of reduced airflow caused by the buildup of ice on the inlet louvers or fill structure of the tower. More particularly, it is concerned with cooling towers including deicing apparatus preferably in the form of an elongated, substantially continuous passageway or slot located in the distribution basin floor adjacent the outer margin thereof, in conjunction with a plurality of elongated, end-to-end, individually actuatable water flow-blocking cover members which can be shifted vertically as needed in order to permit selective flow of hot water through the marginal basin slot in quantities sufficient to deice the air inlet face of the tower fill structure as well as the adjacent inlet louvers.

Wintertime operation of evaporative water cooling towers in northern climates where sub-freezing ambient temperatures are experienced present a number of difficult problems. One of the most serious problems from the standpoint of tower performance stems from the tendency of evaporative towers to ice up at or adjacent to the air inlet face thereof. In practice, droplets of water, spray, fines and water vapor developed during gravitational flow of initially hot water through the tower fill structure tend to freeze on the marginal surfaces of the tower not directly exposed to the gravitating hot water. In severe instances, the air inlet face of the tower can become clogged to an extent to drastically lessen airflow through the fill structure, and this in turn measurably reduces tower efficiency. The buildup of ice can also represent a significant problem by virtue of damage to the tower components stemming from the weight of the ice. Ice clogging can be particularly troublesome with natural draft towers employing a tall hyperbolic stack for inducing airflow through the tower fill. These towers are generally not provided with fans, as are mechanical draft towers, which can be reversed as needed to deice the air inlet face of the tower.

A number of expedients have been proposed in the past to combat the problem of cooling tower icing. For example, in U.S. Pat. No. 3,117,170, a plurality of shallow, open top troughs extending from the fill structure to the inlet louvers were provided for deicing purposes. In addition, in U.S. Pat. No. 3,322,409, deicing apparatus especially adapted for use in relatively large natural draft towers is disclosed. In this instance basin and conduit means are provided for segregating water flow from the distribution basin so that during wintertime operations relatively large quantities of hot water are directed toward the outer section of the fill and tower structure.

Although deicing apparatus such as those disclosed in the above identified patents have achieved a considerable degree of commercial success, certain problems remain. For example, the water distribution and deicing apparatus disclosed in U.S. Pat. No. 3,322,409 is relatively complex and costly, and is therefore objectionable for these reasons. On the other hand, the water-conveying troughs of U.S. Pat. No. 3,117,170 make it difficult to selectively direct quantities of water for deicing purposes. As can be appreciated, it is generally not necessary or desirable to continuously operate a water cooling tower in a deicing mode, since this can have the effect of lowering overall tower performance and may result in an undesirable buildup of ice elsewhere in the tower structure. Therefore, it is generally desirable to have a means of selectively deicing a water cooling tower as necessary, and preferably this function should be accomplished with a minimum of operator time and labor.

It is therefore the most important object of the present invention to provide a simplified, relatively low cost deicing apparatus for use with essentially all types of evaporative water cooling towers which is designed for easy, effective operation in order to deice the outer margins of the tower as necessary during operations at sustained subfreezing temperatures, and with a minimum cost in terms of operator time and labor.

Another object of the invention is to provide deicing apparatus usable with both natural draft and mechanical draft evaporative cooling towers and which includes structure defining a hot water passageway in the distribution basin at an area thereof overlying the outer margin of the tower, in conjunction with cover means normally disposed in a flow-blocking disposition to the passageway which is shiftable as desired to initiate and stop flow of water through the deicing passageway; in preferred forms, the basin is configured to present an elongated, substantially continuous peripheral slot adjacent the outer edge of the floor thereof, and a plurality of elongated, end-to-end, individually actuatable cover members are positioned over the slot along with lifting mechanism for vertically shifting the cover members between the flow-blocking disposition thereof and an open position permitting flow of sufficient quantities of hot water through the slot to deice the outer margin of the tower.

A still further object of the invention is to provide a water cooling tower having deicing apparatus of the type described and wherein the lifting mechanism includes an expandable bladder adapted to hold and expel quantities of fluid which in turn controls the vertical disposition of the cover members so that the latter can be raised or lowered individually or in unison as necessary for deicing of the tower or for permitting normal operation thereof.

Figure 1:
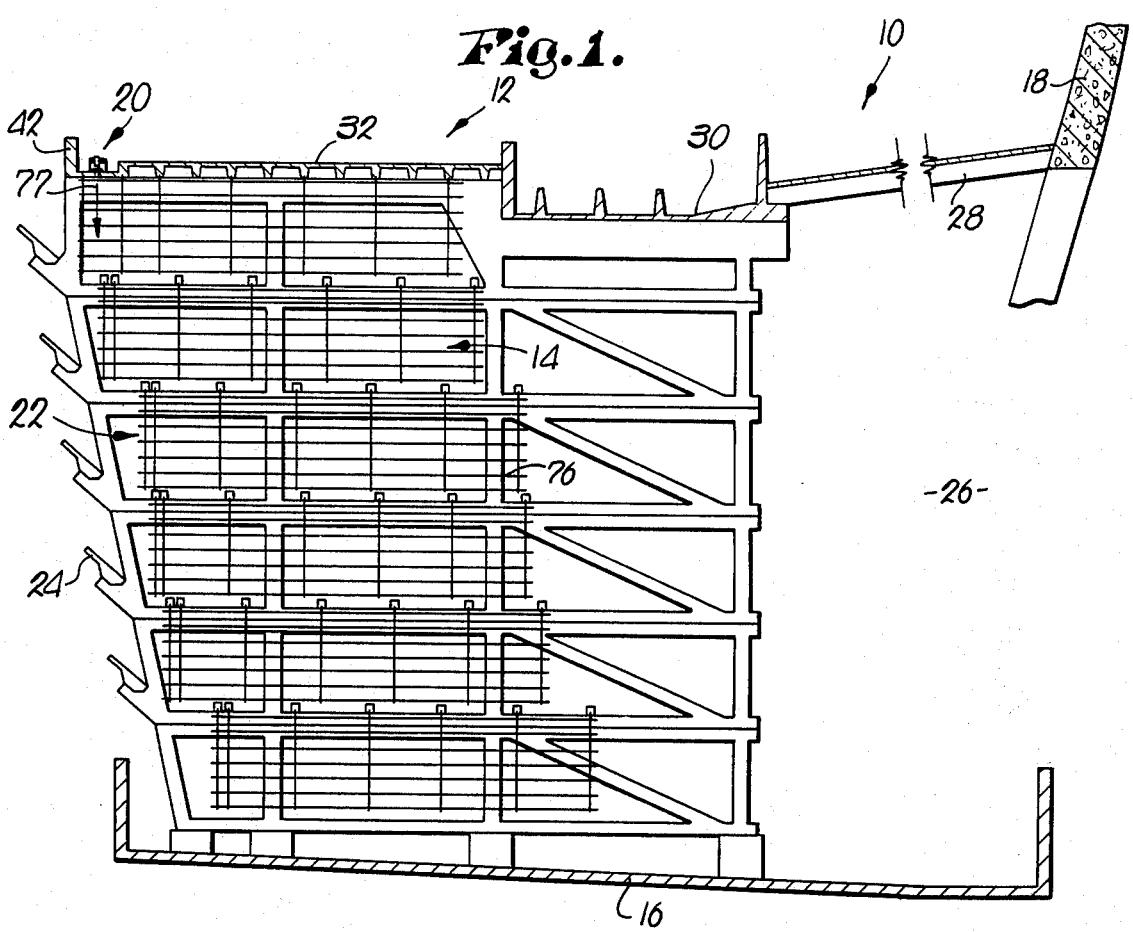
FIG. 1 is a fragmentary view in partial vertical section of a generally annular natural draft crossflow evaporative cooling tower having the deicing apparatus of the present invention.
Figure 2:
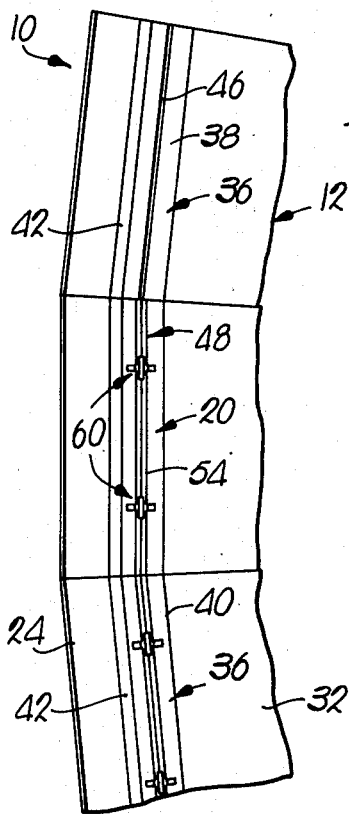
FIG. 2 is a fragmentary plan view of the tower depicted in FIG. 1, and illustrating the peripheral water flow slot, cover members therefor, and cover lift mechanisms.

A generally annular, crossflow, natural draft cooling tower 10 in accordance with the invention is shown fragmentarily in FIGS. 1 and 2. Tower 10 broadly includes an upper hot water distribution basin 12 adapted to receive and distribute hot water to be cooled, evaporative fill structure 14 beneath basin 12, a generally annular cold water collection basin 16 underlying the fill structure, and a hyperbolic stack 18 for directing ambient-derived air currents through the fill structure in intersecting, generally crossflowing relationship to the gravitational flow of water therethrough. In addition, tower 10 is provided with deicing means broadly referred to by the numeral 20 which is operable to selectively deice the outer margin of the tower including the air entrance face 22 of fill structure 14, and the vertically stacked, inclined, circumferentially extending air inlet louvers 24. As is conventional with towers of this type, the outer annular fill portion thereof along with annular canopy section 28 define a central plenum chamber 26 in communication with stack 18. Moreover, water supply means in the form of an annular flume 30 is provided inboard of distribution basin 12 for the purpose of delivering quantities of initially hot water to the latter for dispersal and gravitational flow through fill structure 14.

Figure 3:
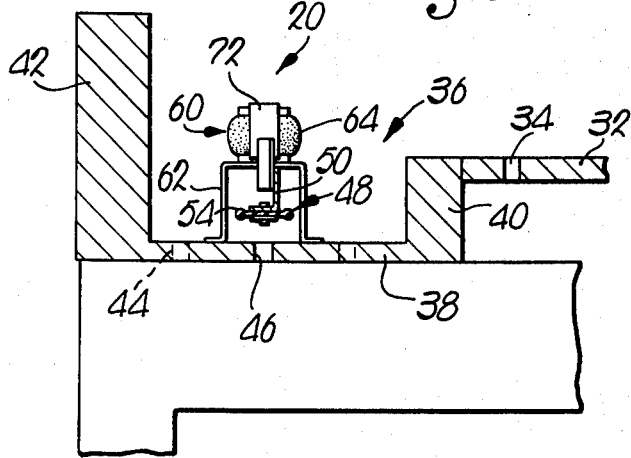
FIG. 3 is an enlarged, fragmentary view in partial vertical section illustrating in detail the deicing apparatus of the present invention as it would appear during deicing operations.

In more detail, it will be seen that distribution basin 12 is made up of a series of floor sections 32 which are apertured as at 34 (see FIG. 3) and positioned in abutting, side-by-side relationship in order to define a generally annular basin. (In actual practice, the radial joints between the floor sections 32 may be filled with grouting for connecting the sections.) The outer margin of each floor section 32 is defined by an elongated, open top section 36 which includes an apertured floor portion 38, an inboard, upstanding wall 40 and a somewhat higher, upstanding outermost peripheral wall 42. As best seen in FIG. 3, the inboard wall 40 of each marginal section 36 abuts the outer edge of a corresponding floor section 32, with floor portion 38 being at a vertical level lower than that of section 32. This orientation of floor portion 38 relative to the remainder of the basin 12 is preferred in the case of natural draft towers for economy of operation, but is not essential. Finally, it will be seen that basin 12 and flume 30, as well as underlying horizontal splash bar fill structure 14 and outer louvers 24 are supported by an annular prefabricated, sectionalized skeletal frame 33 constructed in accordance with U.S. Pat. No. 3,834,681.

As explained, floor portion 38 of section 36 is apertured as at 44 in order to disperse water entering section 36 for gravitational flow through the underlying portion of fill structure 14. In addition, floor portion 38 is configured to present an elongated, substantially continuous passageway or slot 46 therethrough which may be beveled as depicted and which is sized to permit flow of hot deicing water therethrough in substantially greater quantities than would be possible simply by virtue of the normal operational flow through the apertures 44. The slots 46 in each section 36 are arranged with the slots in adjacent sections so that a substantially continuous circumferentially extending passageway is presented around tower 10. The passageway may in some cases be interrupted by radial grouting applied between the floor portions 38, and thus it may not be fully continuous. An elongated, shiftable cover 48 is positioned over each slot 46 in at least partial water flow-blocking disposition to the latter. The covers 48 are also disposed in an end-to-end fashion for cooperatively covering the circumferential water passageway presented in basin 12.

Figure 4:
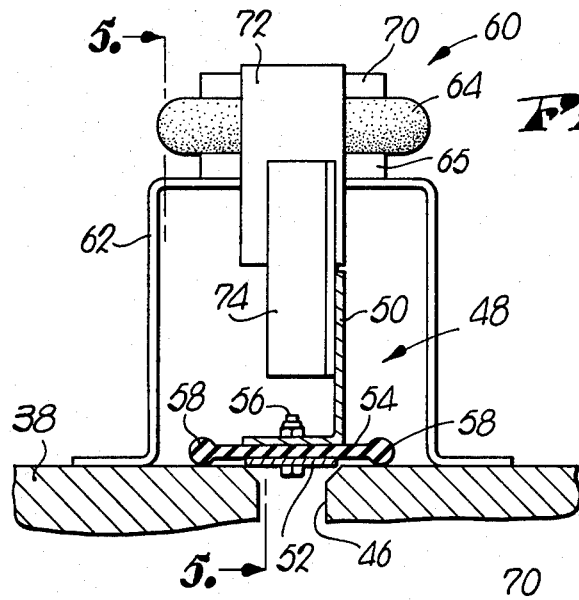
FIG. 4 is a fragmentary view in partial vertical section of the deicing apparatus of the invention, and illustrating the bladder-controlled cover lifting mechanism thereof.
Figure 6:
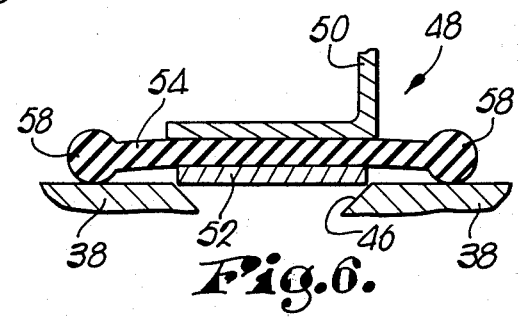
FIG. 6 is a fragmentary vertical sectional view illustrating the flow-blocking function of the flexible seal member of the flow-blocking cover.
Figure 5:
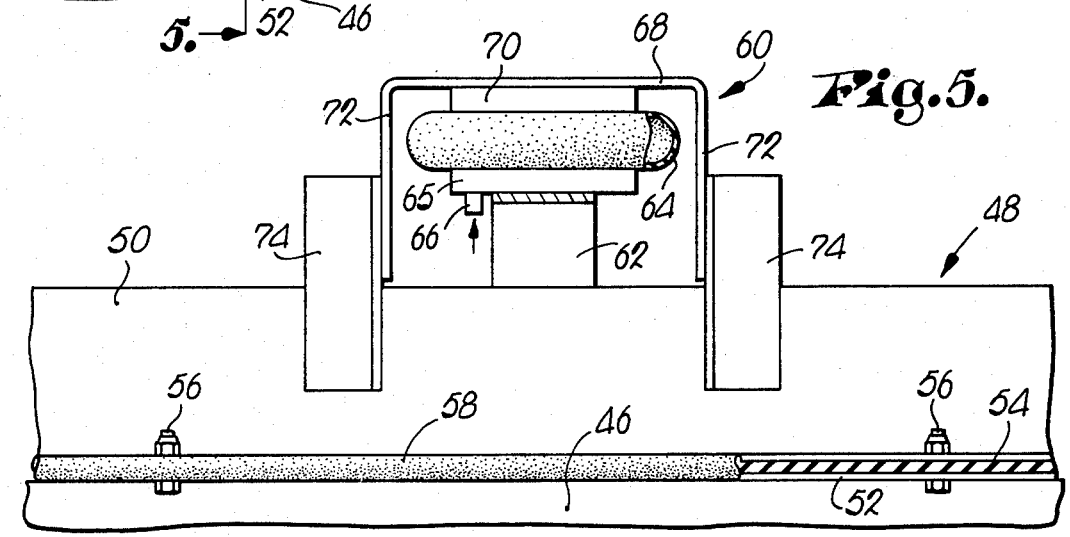
FIG. 5 is a sectional view taken along irregular line 5—5 of FIG. 4 and further illustrating the construction of the cover lifting mechanism.

As best seen in FIGS. 4–6, each cover 48 includes an elongated, generally transversely L-shaped upper support 50 and a spaced, elongated lowermost plate 52. An elongated, flexible, rubber-like seal member 54 is sandwiched between upper support 50 and plate 52, with the three elements being connected together at spaced intervals by means of bolts 56. Each seal member 54 is of length to substantially cover the corresponding underlying slot 46 and is of a width greater than that of the support 50 and plate 52 as best seen in FIG. 6. The seal 54 also includes elongated, marginal beading 58 on both sides thereof which is adapted to engage floor portion 38 on opposite sides of slot 46 in order to effect at least a partial seal of the latter.

Deicing means 20 also includes means for vertically shifting the cover 48 as needed between the normal flow-blocking disposition thereof and an elevated, deicing position permitting flow of water through the underlying slot 46. As best seen in FIG. 2, a pair of lifting mechanisms 60 are provided with each cover 48 so that the latter are individually operable. Each shifting mechanism 60 includes a generally U-shaped, downwardly opening frame member 62 which is attached to floor portion 38 on opposite sides of slot 46 and in bridging relationship to the latter. An expandable bladder 64 is mounted atop the frame member 62 by means of a connective element 65 and is variably fillable with a fluid such as air or nitrogen through an appropriate inlet port 66 therein. A second generally U-shaped lifting member 68 is secured atop bladder 64 by means of another connective element 70. As best shown in FIGS. 4 and 5, lifting member 68 is positioned crosswise of U-shaped frame member 62 and has depending legs 72 extending toward the upper portion of L-shaped support 50. Short, angled connectors 74 are secured to each depending leg 72 and the underlying support 50 so that the latter, along with the other elements of cover 48, shift vertically with lifting member 68. It will thus be seen that expansion of the bladders 64 will cause the connected covers 48 to rise, while deflation of the bladders will permit the covers to return to their respective flow-blocking positions.

During normal water cooling operations with tower 10, hot water to be cooled is directed by conventional piping and riser means (not shown) to flume 30, whereupon the water overflows the outboard upstanding wall of the flume and enters annular distribution basin 12. At this point the water gravitates through the apertures 34 in the floor sections 32, as well as through the apertures 44 in the floor portions 38 of the outer bason sections 36. Thus, during normal summertime operations or during winter when deicing is not a problem, a substantially even flow throughout the radial and circumferential extent of basin 12 is accomplished. In this connection it should be noted that some flow of hot water through slot 46 may occur during the normal operating mode without creating problems but in general this flow should not be of sufficient magnitude to significantly disrupt the desirable even design water flow from the tower basin. As is well understood in this art, the hot water gravitating from basin 12 is dispersed upon hitting fill structure 14 and is evaporatively cooled by the crossflowing air currents induced by hyperbolic stack 18. In this regard it is to be understood that any one of a number of conventional fill structures can be used to good effect in the invention. As depicted, a series of elongated, generally horizontally extending splash bars 76 are provided, but vertically oriented film-type fill structure could also be used as well. The cooled water gravitating from fill structure 14 is collected in basin 16 in the conventional manner, and is thereafter returned to the site of use.

When tower 10 is operated during sustained subfreezing conditions and ice develops along the outer marginal edge thereof (i.e., along the louvers 24 and the air exit face 22 of fill structure 14), the following deicing procedure is followed. First, should it be desired to deice the entire periphery of annular tower 10, the bladders 64 of each lift mechanism 60 are simultaneously or sequentially filled with sufficient fluid to cause the bladders to expand. This fluid may be a liquid antifreeze solution or compressed air, but preferably is gaseous nitrogen. In any event, filling of the respective bladders 64 causes the lifting members 68 to rise as best shown in FIG. 3 which in turn lifts the corresponding covers 48 from their normal water flow-blocking disposition. This causes a relatively heavy flow of hot water within basin 12 through the slots 46 in order to deice the outer margin of tower 10. Referring to FIG. 1, it will be seen that this deicing water flow (represented by arrow 77) travels down the air entrance face of fill structure 14 and along the lower inlet louvers 24. In practice, it has been found that the water level in basin 12 should be at least about three inches above slot 46 in order to ensure adequate flow of deicing water.

Deicing of tower 10 can continue in this fashion until the outer margin thereof is sufficiently deiced to assure relatively unimpeded airflow through fill structure 14. At this point, the respective bladders 64 are deflated which in turn causes the lifting members 68 and connected covers 48 to shift back to the normal flow-blocking dispositions thereof. This shifting procedure can of course be repeated as often as necessary in order to facilitate cold weather operation of tower 10. It should also be noted that it is possible with the deicing apparatus of the present invention to deice only portions of the periphery of tower 10 as the need arises. This would involve merely actuating only those lift mechanisms 60 overlying the areas of the tower to be deiced, while the remaining covers remain in place.

Figure 7:
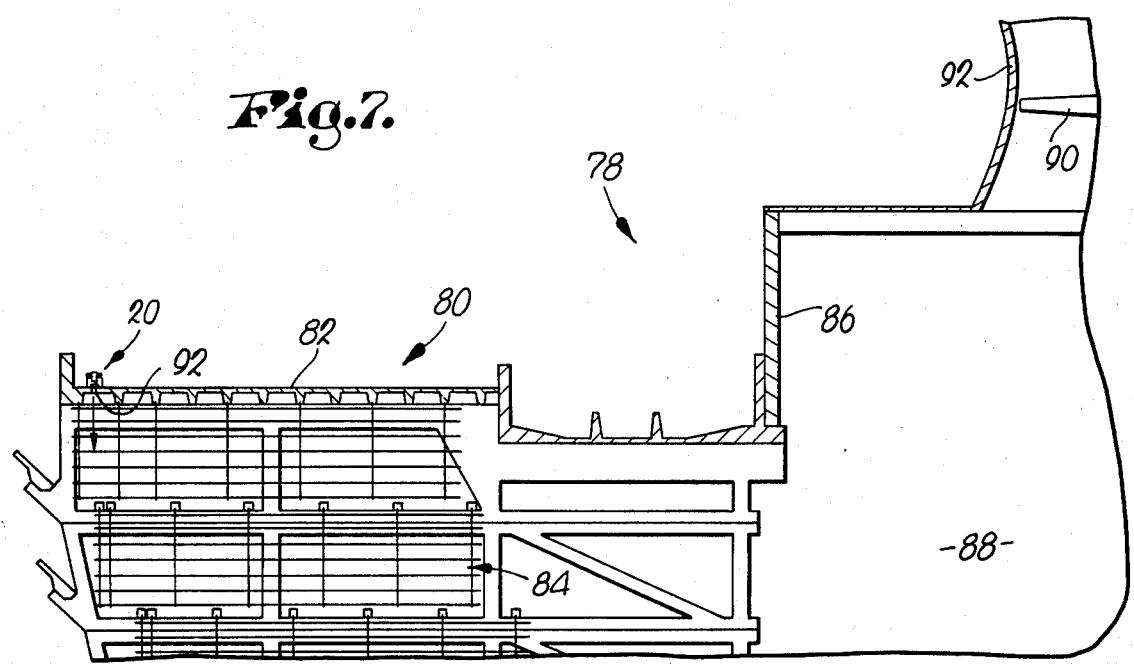
FIG. 7 is a fragmentary view in partial vertical section of a rectangular mechanical draft crossflow cooling tower having the deicing apparatus of the present invention.

Although the deicing apparatus in accordance with the invention has been described in connection with an annular, crossflow, natural draft cooling tower, it is to be understood that the invention is not so limited. For example, and referring specifically to FIG. 7, it will be seen that an elongated, mechanical draft tower 78 can be provided which incorporates the concepts of the present invention. Of course, other types of mechanical draft towers such as the round or annular variety may also include the deicing apparatus hereof. Tower 78 includes an elongated, generally rectangular, sectionalized upper hot water distribution basin 80 having an apertured floor 82, in conjunction with underlying, horizontal splash bar evaporative fill structure 84, and a lower cold water collection basin (not shown). Tower 78 is of generally rectangular configuration and includes conventional casing structure 86 which defines an internal plenum chamber 88. A mechanically powered fan 90 circumscribed by a venturi-shaped velocity recovery stack 92 is mounted atop structure 86 and communicates with plenum chamber 88. As is well understood in this art, fan 90 is operable to pull crossflowing air currents through fill structure 84 in intersecting, thermal interchange relationship to the hot water gravitating from basin 80 for efficient, evaporative cooling of the hot water.

In this instance, the outer marginal sections of basin floor 82 are at the same level vertically as the corresponding inboard portions of the floor sections. However, the outer portions are cooperatively configured to present an elongated, substantially continuous slot 92 which extends substantially the entire length of rectangular basin 80; as with the passageway of tower 10 however, slot 92 may be interrupted by radial grouting applied between the floor sections. As in the case of tower 10, a series of abutting, end-to-end cover sections are provided in overlying disposition to the slot 92, with a plurality of individually operable lifting mechanisms 60 for raising and lowering the covers as needed to deice tower 78. The preferred lifting mechanisms 60 employed with tower 78 are identical in every respect to those used in tower 10, and therefore a description of these mechanisms will not be repeated. In addition, the deicing operation of tower 78 is essentially identical with that described above in connection with tower 10 and involves selectively raising the slot covers as needed to permit gravitational flow of deicing water along the outer margin of the tower.

Having thus described the invention, what is claimed as new and desired to be secured by Letters Patent is:

1. A water cooling tower comprising:
   a hot water distribution basin having a generally horizontal bottom wall;
   fill structure beneath said distribution basin for dispersing hot water gravitating from the latter for enhancing the evaporative cooling of the hot water;
   a cold water collection basin beneath said fill structure for collecting cooled water gravitating from the latter;
   means for directing ambient derived air currents through said fill structure for cooling of the hot water gravitating therethrough; and
   selectively actuatable deicing means for deicing the outer margin of said tower, including
   horizontal, elongated slot means extending through the bottom wall of the distribution basin at an area of said bottom wall generally parallel to and overlying the outer margin of said tower, said slot means being configured and arranged for downward delivery of sufficient quantities of hot water therethrough directly onto at least a portion of said outer margin of the tower to effect deicing thereof under cold weather conditions;
   elongated, shiftable cover means overlying said slot means in at least partial water flow-blocking disposition thereto; and
   selectively actuatable means for shifting said cover means as desired from said flow-blocking disposition to a deicing position permitting free flow delivery of hot water through said slot means, and for selective return of said cover means to said flow-blocking disposition when deicing of the tower is complete.

2. The cooling tower as set forth in claim 1 wherein said slot means comprises an elongated, substantially continuous slot located adjacent the outer margin of said distribution basin.

3. The cooling tower as set forth in claim 1 wherein said distribution basin floor has an outer section at a lower level vertically than the remainder of said basin floor, said slot means being located in and extending along such lower level section.

4. The cooling tower as set forth in claim 1 wherein said hot water distribution basin, fill structure and collection basin are each generally annular in configuration, said slot means comprising a substantially continuous annular slot extending substantially continuously around said basin, said cover means comprising a plurality of sections positioned over said slot with selectively actuatable means for shifting said covers sections individually.

5. The cooling tower as set forth in claim 1 wherein said hot water distribution basin and fill structure are each of elongated, generally rectangular configuration, said slot means comprising a substantially continuous slot extending substantially the entire length of said distribution basin.

6. The cooling tower as set forth in claim 1 wherein said air-directing means is operable for directing said air currents through said fill structure in generally cross-flowing, intersecting relationship to the gravitational flow of water therethrough.

7. The cooling tower as set forth in claim 6 wherein said air-directing means comprises a hyperbolic stack for pulling said air currents through said fill structure.

8. The cooling tower as set forth in claim 6 wherein said air-directing means comprises powered fan means for pulling said air currents through said fill structure.

9. The cooling tower as set forth in claim 1 wherein said cover means includes a flexible, rubber-like seal member configured for covering said slot means.

10. The cooling tower as set forth in claim 1 wherein said cover shifting means comprises:
an expandable bladder adapted to hold quantities of fluid;
means supporting said bladder above said cover means;
means operably connecting said bladder and cover means for vertical shifting of the latter in response to expansion and contraction of said bladder caused by filling and draining of the bladder with fluid.

11. The cooling tower as set forth in claim 10 wherein said frame includes a first upright U-shaped member secured to said basin in bridging relationship to said slot, said bladder being positioned atop said first U-shaped member, said connecting means including a second generally U-shaped member positioned crosswise of the first U-shaped member and atop said bladder with the legs of the second member depending therefrom, there being a connecting element securing each of said depending legs to said cover.

* * * * *